July 19, 1966　　J. M. BOSLAND ETAL　　3,261,103
MAGNETIC COMPASS
Filed March 5, 1963　　2 Sheets-Sheet 1

INVENTOR.
JAMES M. BOSLAND
JAMES HUNTER GILTZOW
BY Darby + Darby
ATTORNEYS

July 19, 1966 J. M. BOSLAND ETAL 3,261,103
MAGNETIC COMPASS
Filed March 5, 1963 2 Sheets-Sheet 2

INVENTOR.
JAMES M. BOSLAND
JAMES HUNTER GILTZOW
BY
*Darby & Darby*
ATTORNEYS

United States Patent Office
3,261,103
Patented July 19, 1966

3,261,103
MAGNETIC COMPASS
James M. Bosland, Wayne, and James Hunter Giltzow, Roseland, N.J., assignors, by mesne assignments, to Aqua Meter Instrument Corporation, Roseland, N.J., a corporation of New Jersey
Filed Mar. 5, 1963, Ser. No. 263,385
15 Claims. (Cl. 33—225)

The present invention relates to a compass and particularly to a compass intended for marine use.

More particularly still the invention relates to means for compensating a compass to reduce the error resulting from magnetic deviation, i.e. deviation due to metal masses or sources of magnetic influence situated near the compass, and especially to compensate in such manner that the compass is substantially accurate at all headings. This increased accuracy at all compass headings is brought about in large measure by mounting the compensating magnets off-center on the compensating shafts rather than on center as has been the practice heretofore.

The compensating means is unique also in that it is arranged for ready adjustment irrespective of the particular mode of mounting the compass, the compensating shafts extending from two of the intercardinal points to the opposite two, that is, taking the lubbers line as representing a conventional "North" direction of the compass housing from Northwest to Southeast and Northeast to Southwest rather than from one of a pair of cardinal points to another as is customary.

With this arrangement of the compensating rods and the magnets mounted thereon the compass is compensated by heading the boat on which the compass is mounted successively to the intercardinal points and removing the deviation rather than heading it in the customary manner to the cardinal points and then removing the deviation by the adjustment of the compensators.

Additionally, the compass of our invention is provided with a liquid filled dome-like enclosure so arranged that even under conditions of rather wide temperature variation no air bubble is formed within the enclosure.

It is an object of the invention to provide a compensating means for a compass which, while simple in nature, assures a greater accuracy on all headings than has heretofore been attainable except with extremely complex and expensive apparatus. In other words, the compensating means of the instant invention provide an extremely flat curve of compensation.

It is another object of the invention to provide intercardinal compensating means rather than the customary cardinal compensating means.

It is another object of the invention to provide such compensating means or shafts which are readily installed in the compass case in a precise position relative to the bar magnet comprising the compass and which when installed are rigidly held in place and retained in their adjusted positions.

It is a further object of the invention to provide a compass having a dome as described above, the compass dome being filled with a liquid, there being means to prevent the formation of air bubbles in the liquid.

It is a still further object of the invention to provide a mounting for the compass which holds it in an adjusted position.

It is a still further object of the invention to provide a compass of the type described which is readily adapted to mounting either as a unit of a modular instrument panel or upon a horizontal surface by use of a bracket type housing or as a separate unit upon a vertical or inclined instrument panel.

Other objects and features of the invention will be apparent when the following description is considered in connection with the annexed drawings, in which.

Figure 5:
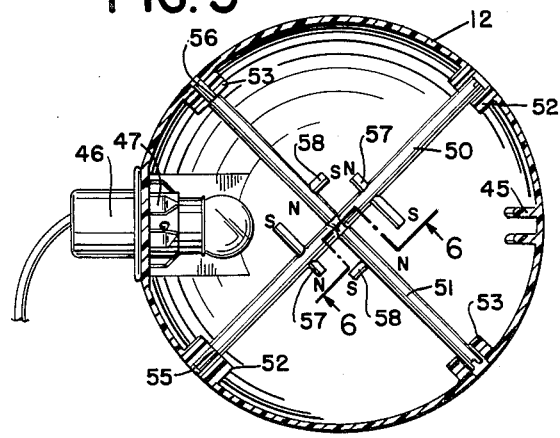
FIGURE 5 is a horizontal cross-sectional view taken on the plane of the line 5—5 of FIGURE 1 and showing particularly the compensating shafts and the manner of mounting these shafts and the compensating magnets thereon.
Figure 6:
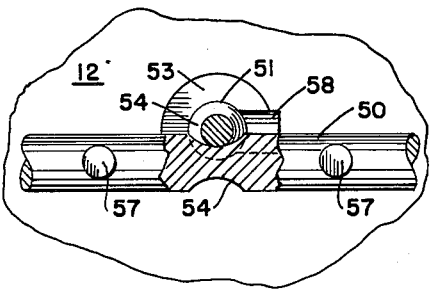
Figure 7:
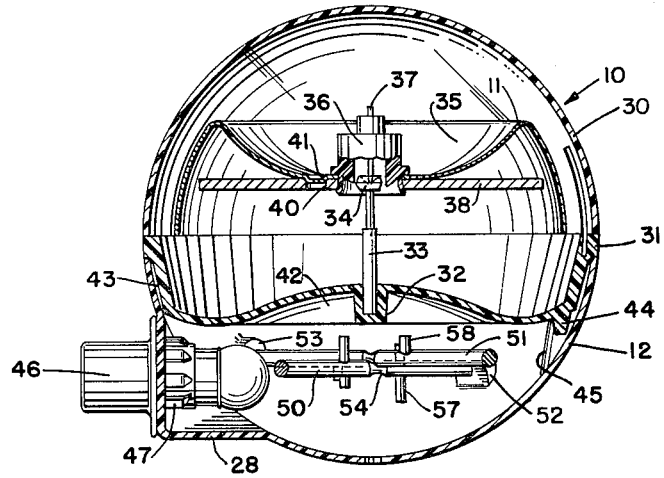

FIGURE 6 is a fragmentary cross-sectional view taken along the plane of the line 6—6 of FIGURE 5 showing particularly the manner in which the compensating shafts interlock to hold them in position in their mounting means and to exert pressure upon each shaft so that it will retain an adjusted position; and FIGURE 7 is a vertical cross-sectional view of the compass and compensating means removed from the housing showing particularly the mode of assembly of the compass dome to the bowl housing the compensating means and also the mode of mounting a lamp in the bowl for illuminating the compass card.

Figure 1:
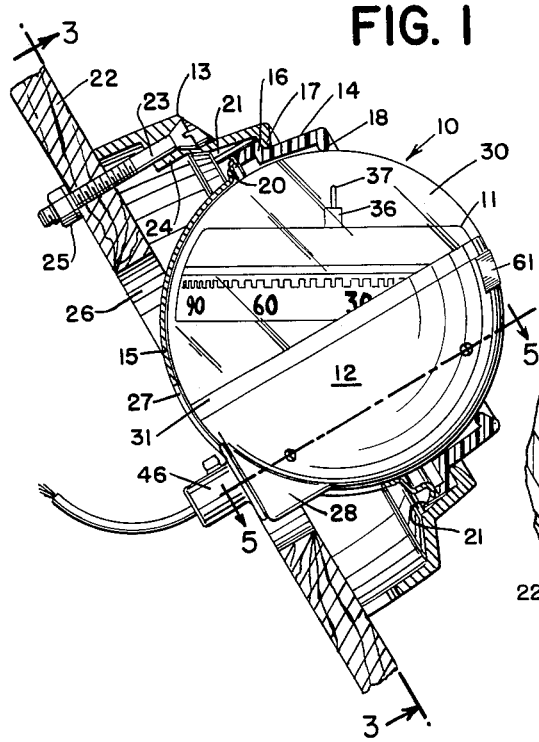
FIGURE 1 is a vertical cross-sectional view of an inclined instrument panel having a compass in accordance with our invention mounted thereon, the view being taken on the plane of the line 1—1 of FIGURE 2.
Figure 2:
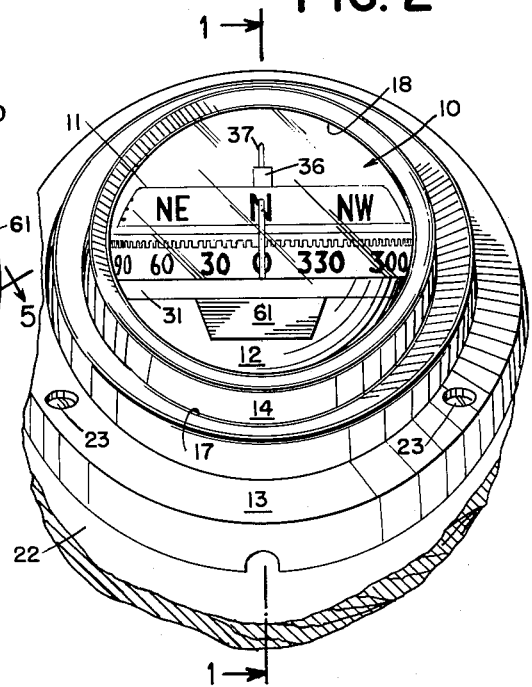
FIGURE 2 is a fragmentary front elevational view of the instrument panel and the compass of FIGURE 1.

Referring now to FIGURES 1 and 2, it will be seen that the compass unit comprises the generally hemispherical transparent dome 10 housing the compass card 11 and the usual magnet and extending not only thereover but also thereunder so as to enclose them completely, as will be hereinafter described. The compass unit also comprises the opaque lower hemispherical portion or bowl 12 which houses the compensating shafts as well as a lamp bulb arranged to illuminate the compass card 11 by means of light dispersed through the base of dome 10.

The complete compass comprising the portions 10 and 12 is mounted in a housing which includes a generally cylindrical mounting member such as 13 together with a retaining rim 14 and a rear housing element 15. Rim 14 is provided with an outwardly extending flange 16 which mates with flange 17 extending inwardly from the outer portion of mounting member 13. Also, the rim 14 is provided with an inwardly extending flange 18 of such dimension that the circular opening formed is of lesser diameter than the diameter of the ball unit comprising portions 10 and 12 as previously described. Housing 15 is substantially hemispherical and is fixed to the mounting member 13 by means of an outwardly extending flange 20 which, in assembly, is forced over the inwardly extending ribs 21 made integral with the inner surface of the mounting member 13 as clearly shown in FIGURE 1.

The unit formed as described above is adapted to be mounted on a surface which is either vertical or inclined. As shown in FIGURE 1 it is mounted on an instrument panel 22 which is inclined to the vertical, the mounting being effected by means of the screws 23 which pass through bosses 24 integral with the mounting member 13 and through holes in the panel 22 and are provided with nuts 25 at the rear of the panel. As clearly shown in FIGURE 1, the instrument panel is provided with a circular opening 26 which permits a portion of the housing 15 to extend therethrough. It should also be pointed out that the housing 15 is provided with a slot 27 which an extension 28 of the bowl 12 of the compass is guided thereby guiding the parts 10 and 12 for limited oscillation about a horizontal axis.

Referring now to FIGURE 7, it will be seen that the dome 10 is formed of two portions 30 and 31. The upper portion 30 is preferably made of a clear plastic material and is substantially a hemisphere. The lower portion 31 is manufactured of a translucent plastic and, as shown, constitutes a base for the portion 30, the two pieces of plastic 30 and 31 being fused together at their juncture. Mounted at the center of the base 31 and in a boss 32 formed integrally with that base is a support 33 having a jewel bearing 34 fixed at the top thereof.

The compass card 11 is in the form of a zone of a sphere and has a reentrant top portion 35 which has a small metallic cylinder 36 integral therewith or fixed thereto. Pressed into this cylinder 36 is a metallic rod 37, the lower end of which is pointed and which rests upon the usual depression in the jewel 34 to constitute the jewelled bearing support for the compass card and for the magnet 38.

Magnet 38 is a bar magnet and is provided with a central aperture through which the skirt portion of the cylinder 36 extends, thus fixing the magnet 38 to the compass card, the magnet also being provided with a small aperture 40 into which a circular boss 41 of the compass card extends, thereby assuring that the North seeking pole of the bar magnet 38 will be adjacent the South designation on the compass card.

The lower portion or base 31 of the housing is provided with a curved portion 42 which provides for expansion of the volume included within the dome 10 and the base 31 and thus for expansion of the usual liquid with which that space is filled. Conversely, upon a fall in temperature and contraction of the liquid filling, the diaphragm will contact and thus prevent air or other gas absorbed in the liquid from forming a bubble although it should be pointed out that if under extreme temperature conditions such a bubble should occur it would, upon a rise in temperature and consequent rise in pressure, be reabsorbed by the liquid.

As clearly shown in FIGURE 7 the base member 31 is provided with a peripheral recess 43 and this peripheral recess forms a seat for the upper edge of the bowl portion 12. Additionally, base portion 31 is provided with a downwardly projecting finger 44 which finger extends between two ribs 45 formed integrally with the bowl 12 at the front thereof and spaced apart a slightly greater amount than the diameter of the finger 44. By means of the ribs 45 and finger 44 the dome 10 is prevented from rotating with respect to the bowl 12. The bowl 12 is provided with an integral generally rectangular extension 28. The wall of the extended portion 28 of the bowl 12 has an aperture therein in which a lamp socket 46 is mounted, the socket being held in position by means of the usual spring fingers 47. In the particular instance shown the socket is of the bayonet type and the lamp correspondingly of the bayonet type and positioned within the bowl 12 to shine upon the translucent base portion 31 and thus shine upon and illuminate the compass card 11.

As has been indicated hereinabove, means are provided for compensating for compass deviation which may result from the presence of large masses of magnetic material or other sources of magnetic interference. As is well known, such magnetic interference is effective to attract the compass magnet and cause its indication to vary from the proper one. Amongst the sources of magnetic deviation may be mentioned a steel center board or an inboard engine as well as the usual generators, steering wheels with metal cores, electrical windshield wipers and ammeters.

The compensating means utilized in this compass comprise two shafts extending at right angles to each other and supported in the bowl 12. These shafts are designated 50 and 51. Shaft 50 extends across the housing from the Northwest to the Southeast assuming that the lubbers line at which the heading is read is positioned North and, under the same assumption, the shaft 51 extends from Northeast to Southwest. It will be observed that this use of compensating means at the intercardinal or midcardinal points is unique. It will also be observed that by so locating these compensating shafts, the shafts may be rotated to perform the compensating operation without removing the compass from its mounting as would be necessary were the compensating shafts to extend between cardinal points of the compass, that is, were the shafts to extend North and South and East and West, since in this case the forward end of one shaft, i.e. the North-South shaft, would be accessible but the forward end of the other or East-West shaft would always remain within the flange 18 of the rim 14 and could not be adjusted.

The shafts 50 and 51 are mounted in inwardly extending apertured bosses 52 and 53 formed integrally with the bowl 12, the apertures extending through the wall of bowl 12. Each of the shafts 50 and 51 is formed with a circumferential groove 54 and these grooves retain the shafts 50 and 51 in their mounting and at the same time exert pressure to cause shafts to remain in adjusted rotational position. The shafts 50 and 51 are assembled into the bowl 12 by first slipping the forward end of shaft 50 into the aperture of front boss 52 and then aligning it with and sliding it rearwardly until it enters the aperture in rear boss 52 and the shoulder 55 engages the rear boss. Thereafter the forward end of shaft 51 is inserted in the aperture in the forward boss 53 and the rear end of the shaft is pressed downwardly and the shaft simultaneously moved rearwardly so that the rear end of the shaft enters the aperture in the rear boss 53, the shoulder 56 seating against the wall of the boss.

It will be clear from the above description that shaft 51 is installed in the bowl 12 by virtue of springing both shafts 50 and 51, the ungrooved portion of one bearing against the grooved portion of the other until the shaft 51 has moved rearwardly to such an extent that the grooves 54 of the two shafts 50 and 51 interengage. As will be clear, the shafts 50 and 51 continue, after the grooves interengage, to be under some pressure and are thus retained in an adjusted position. It should also be noted that the cross-sectional shape of grooves 54 is such that there is substantially line contact at the shaft centers preventing rotation of one shaft from rotating the other.

In order to perform the compensating function each shaft 50 and 51 has a pair of compensating magnets respectively designated 57 and 58 mounted thereon. Magnets 57 and 58 are small cylindrical bar magnets and are mounted on their respective shafts 50 and 51 by inserting them in transverse holes drilled in the shafts.

The two magnets of the pair 57 are mounted eccentrically with respect to each other, that is, one of the magnets 57 extends a greater distance to one side of the shaft 50 than to the other while the other magnet 57 extends a greater distance to the first side than to the second as seen in FIGURE 5. In like manner the magnets of the pair 58 are mounted eccentrically of shaft 51 and extend a greater distance in opposite directions.

Thus when the shafts are turned in the neutral position with the magnet poles arranged as designated in FIGURE 5, a magnetic ring structure is present and the effect of the compensating magnets upon the card magnet is completely nullified. It should also be noted that magnets 57 are mounted at greater distance from the center of shaft 51 than are magnets 58 from the center of shaft 50 thereby assuring that magnet gaps in the neutral position are substantially equal around the ring, or more exactly the rectangle.

Referring now to FIGURE 7 it will be seen that when the shafts 50 and 51 are turned so that the magnets 57 and 58 extend vertically, the upper ends of the two magnets 57 and 58 which extend furthest from their respective shafts 50 and 51 will lie in the same horizontal plane and will be equidistant from the main compass magnet 38. Thus, despite the fact that the shafts 50 and 51 are, because of their mounting arrangement as described, necessarily spaced different distances from the compass magnet, the compensating magnets have substantially the same effect as though mounted on shafts in the same plane. Moreover, the gaps between compensating magnets and compass card magnet are modified by rotation of the shafts 50 and 51 and the neutral flux pattern correspondingly altered whereby the compensating function is performed.

Due to this eccentric arrangement of the magnets on shafts 50 and 51 one of the compensating magnets on each shaft is more effective than the other and the compass may be compensated by adjusting the rotational position of the shafts 50 and 51. Thus by mounting the compensating magnets 51 and 58 eccentrically rather than on center has is common, the compensating effect is smoothed out and the accurracy on all headings is assured. The neutral position is indicated at the shaft ends by providing these shafts with the usual screw slot and in addition with a flatted side so that the neutral position may always be set and the compensating process started from this position.

As is usual compensating is performed by first checking to see that the compass is properly positioned on the boat so that a line through the lubber line (indicated by the needle-like member 60 fixed to the base member 31 and extending upwardly in front of the compass card 11, FIGURE 7), and the compass card pivot is parallel to the boat's fore and aft center line. By referring to a marine chart or other means to determine proper heading the boat is headed on one of the mid-cardinal headings such for example as Northeast. If the compass reading is not Northeast then the compensator shaft 50 or 51, the forward end of which is furthest away from either the North or South marking that is visible on the compass card, is rotated to remove one-half of the error. For example, if the compass reads 20° off Northeast it is corrected by rotation of the shaft 50 to read 10° off Northeast. Additional correction on the other mid-cardinal points, that is, Northwest, Southwest, and Southeast, each time removing one-half the total error, will remove the remaining error. The correction process may be repeated if maximum compensation is desired.

As has been indicated hereinabove, the compass of our invention may be mounted either on a vertical surface or on an inclined surface while providing for leveling the compass dome so that the white line, formed by rim 31 exposed between the lower edge of the compass card 11 and the upper edge of bowl 12, is parallel to the water line when the boat is in normal running position. This is done by grasping the small projection 61, FIGURE 1, formed on the forward portion of the upper rim of bowl 12 and rotating the bowl and the dome 10 until the upper edge of rim 31 substantially aligns with the lower edge of the compass card 11 throughout the circumference thereof.

Figure 3:
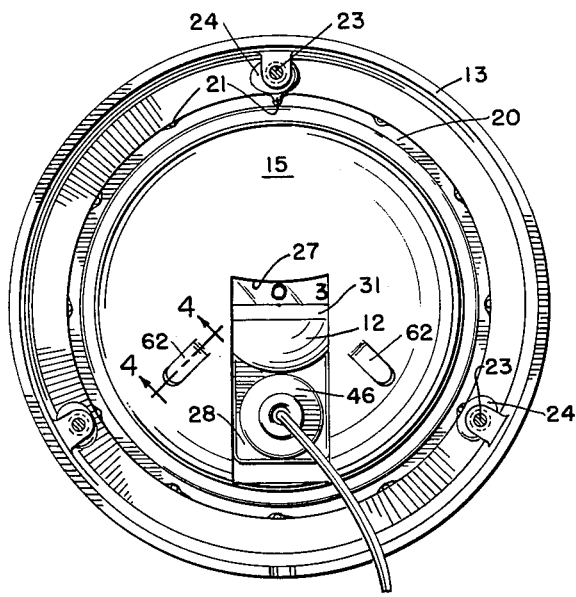
FIGURE 3 is a rear elevational view of the compass of our invention, the view being taken on the plane of the line 3—3 of FIGURE 1.
Figure 4:
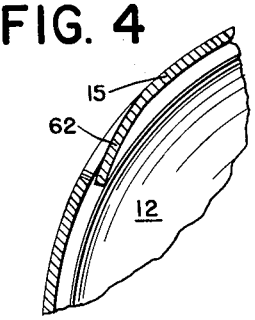
FIGURE 4 is a fragmentary cross-sectional view taken on the plane of the line 4—4 of FIGURE 3 and showing particularly how the outer housing has tabs bent off therefrom to supply spring pressure for holding the rotating dome in an adjusted position.

The compass will remain in this adjusted position due to the fact that the resilient tabs 62, see FIGURES 3 and 4, are bent inwardly from the housing member 15 and bear against the bowl 12, thus urging the dome 10 and bowl 12 against the flange 18 of rim 14 thereby exerting pressure which holds the entire ball structure in the adjusted position with the white line parallel to the water line.

It will be understood that although the use of off-center compensating magnets has been described in connection with a particular way of mounting the compensating shafts and with those shafts extending between opposite intercardinal points these features may be utilized separately rather than in combination; thus the shafts might be in a plane and might in either case extend between cardinal rather than intercardinal points.

We wish therefore to be limited not by the foregoing description of a preferred embodiment of the invention but, on the contrary, solely by the claims granted to us.

What is claimed is:
1. In a compass of the type described, in combination, a generally hemispherical transparent dome completely enclosing a magnet and compass card, the magnet and compass card being supported on a needle point for rotation about a vertical axis, an opaque open bowl member mating with the dome to form a sphere and means mounting said sphere for limited angular adjustment about a horizontal axis to normally position the juncture line between said dome and bowl in a horizontal plane perpendicular to said vertical axis, said mounting means comprising an annular rim of a diameter less than the diameter of said sphere and a hemispherical housing member fixed to said rim, said sphere extending through said opening in said rim and being held against said rim by said hemispherical housing member, said housing member having a vertically extending slot therein and said bowl member having an extension formed thereon, said extension entering said slot and guiding said sphere for angular adjustment about said horizontal axis.

2. In a compass of the type described, in combination, a generally hemispherical transparent dome completely enclosing a magnet and compass card, the magnet and compass card being supported on a needle point for rotation about a vertical axis, an opaque open bowl member mating with the dome to form a sphere, means mounting said sphere for limited angular adjustment about a horizontal axis to normally position the juncture line between said dome and bowl in a horizontal plane perpendicular to said vertical axis, said mounting means comprising an annular rim of a diameter less than the diameter of said sphere and a hemispherical housing member fixed to said rim, said sphere extending through said opening in said rim and being held against said rim by said hemispherical housing member, said housing member having a vertically extending slot therein and said bowl member having an extension formed thereon, said extension entering said slot and guiding said sphere for angular movement about said horizontal axis, and a pair of tabs bent off from said hemispherical housing member and extending inwardly into contact with said bowl, said tabs holding said bowl and dome in an adjusted angular position.

3. In a compass of the type described, in combination, a generally hemispherical transparent dome completely enclosing a magnet and compass card, the magnet and compass card being supported on a needle point for rotation about a vertical axis, an opaque bowl member mating with the dome to form a sphere, means mounting said sphere for limited angular movement about a horizontal axis to normally place the juncture between said dome and bowl in a horizontal plane perpendicular to said vertical axis, and means mounted in said bowl for compensating the compass for magnetic deviation resulting from magnetic interference.

4. In a compass of the type described, in combination, a generally hemispherical transparent dome completely enclosing a magnet and compass card, the magnet and compass card being supported on a needle point for rotation about a vertical axis, an opaque bowl member mating with the dome to form a sphere, means mounting said sphere for limited angular adjustment about a horizontal axis the ends of which define a pair of cardinal points of the compass to position the juncture line between said dome and bowl in a horizontal plane perpendicular to said vertical axis, and means mounted in said bowl for compensating the compass for magnetic deviation resulting from interference, said compensating means comprising shafts extending parallel to lines from a pair of adjacent intercardinal points to the respective diametrically opposite intercardinal points, said shafts having compensating magnets mounted thereon.

5. In a compass of the type described, in combination, a generally hemispherical transparent dome enclosing a magnet and compass card, the magnet and compass card being supported on a needle point for rotation about a vertical axis, an opaque bowl member mating with the dome to form a sphere, means mounting said sphere for limited angular movement about a horizontal axis the ends of which define a pair of cardinal points of the compass to position the juncture line between said dome and bowl in a horizontal plane perpendicular to said vertical axis, and means mounted in said bowl for compensating the compass for magnetic deviation resulting from magnetic interference, said compensating means comprising apertures positioned at the intercardinal points of said compass bowl, one pair of said apertures lying in a horizontal plane and a second pair of said apertures lying in a horizontal plane above said first plane, a pair of shafts each extending from one of said apertures in a plane to the other of the apertures in that plane, each shaft extending from an intercardinal point to the diametrically opposite intercardinal point, and a reduced diameter portion on each said shaft at its mid-point, the planes of said shafts being spaced apart vertically a distance less than the sum of the radii of said two reduced diameter portions whereby said compensating shafts are held in position in said apertures and are frictionally engaged to cause them to retain an adjusted rotational position.

6. In a compass as claimed in claim 5, said reduced diameter portions of said compensating shafts interengaging at a point substantially in alignment with said vertical axis when said vertical axis is perpendicular to said horizontal plane.

7. In a compass of the type described, in combination, a generally hemispherical transparent dome enclosing a magnet and compass card, the magnet and compass card being supported for rotation about a vertical axis, a bowl member mating with the dome to form a sphere, means mounting said sphere for limited angular movement about a horizontal axis extending between a pair of cardinal points to position the juncture line between said dome and bowl in a horizontal plane perpendicular to said vertical axis, and means mounted in said bowl for compensating the compass for magnetic deviation, said compensating means comprising inwardly extending apertured bosses positioned at the mid-cardinal points of said compass bowl, one pair of said bosses lying in a horizontal plane and a second pair of said bosses lying in a horizontal plane above said first plane, a pair of shafts, one shaft being rotatably mounted in the apertures of the bosses in each plane, each shaft extending from a midcardinal point to the diametrically opposite midcardinal point, and a reduced diameter portion on each said shaft at its mid-point, said horizontal planes being spaced apart vertically a distance less than the sum of the radii of said two reduced diameter portions whereby said compensating shafts are held in position in said bowl bosses and frictionally interengage to cause them to retain an adjusted rotational position.

8. In a compass of the type described, in combination, a generally hemispherical transparent dome enclosing a magnet and compass card, the magnet and compass card being supported for rotation about a vertical axis, a bowl member mating with the dome to form a sphere, means mounting said sphere for limited angular movement about a horizontal axis the ends of which lie at cardinal points of the compass to position the juncture line between said dome and bowl in a horizontal plane perpendicular to said vertical axis, and means mounted in said bowl for compensating the compass for magnetic deviation, said compensating means comprising inwardly extending apertured bosses positioned at the mid-cardinal points of said compass bowl, one pair of said bosses lying in a horizontal plane and a second pair of said bosses lying in a horizontal plane above said first plane, a pair of shafts, one rotatably mounted in the apertures of the bosses in each plane, each shaft extending from a midcardinal point to the diametrically opposite midcardinal point, a reduced diameter portion on each said shaft at its mid-point, said planes being spaced apart vertically a distance less than the sum of the radii of said two reduced diameter portions whereby said compensating shafts are held in position in said bowl bosses and frictionally interengage to cause them to retain an adjusted rotational position, and a pair of compensating magnets mounted on each said shaft.

9. In a compass of the type described, in combination, a generally hemispherical transparent dome enclosing a magnet and compass card, the magnet and compass card being supported for rotation about a vertical axis, a bowl member mating with the dome to form a sphere, means mounting said sphere for limited angular movement about a horizontal axis to normally position the juncture line between said dome and bowl in a horizontal plane perpendicular to said vertical axis, and means mounted in said bowl for compensating the compass for magnetic deviation, said compensating means comprising a pair of shafts extending in planes perpendicular to said vertical axis and to the vertical axis of said bowl, said shafts extending at right angles to each other and crossing on said bowl axis, and a pair of compensating magnets mounted on each said shaft and extending transversely of said last named axis, said magnets of each pair being mounted at substantially equal distances from said bowl axis on opposite sides thereof, the magnets on each shaft being of the same length and being mounted eccentrically of the shaft in opposite directions, like poles of the magnets being equidistant from their respective shafts.

10. In a compass of the type described, in combination, a generally hemispherical transparent dome enclosing a magnet and compass card, the magnet and compass card being supported for rotation about a vertical axis, a bowl member mating with the dome to form a sphere, means mounting said sphere for limited angular movement about a horizontal axis, the ends of which lie at cardinal points of the compass to position the juncture line between said dome and bowl in a horizontal plane perpendicular to said vertical axis and to the vertical axis of said bowl, and means mounted in said bowl for compensating the compass for magnetic deviation, said compensating means comprising a pair of shafts extending in planes parallel to said horizontal plane, each said shaft lying in one of said planes and extending from an intercardinal point to the diametrically opposite intercardinal point, said shafts crossing on the axis of said sphere perpendicular to said horizontal plane, and a pair of compensating magnets mounted transversely of each said shaft, said magnets of each pair being mounted equidistantly from said axis of said sphere perpendicular to said horizontal plane, the magnets on each shaft being of the same length and being mounted eccentrically of the shaft, extending a greater distance from the shaft in opposite directions, like poles of the magnets of each pair being equidistant from the shaft on which said pair of magnets is mounted.

11. In a compass of the type described, in combination, a generally hemispherical transparent dome enclosing a magnet and compass card, the magnet and compass card being supported for rotation about a vertical axis, a bowl member mating with the dome to form a sphere, means mounting said sphere for limited angular movement about a horizontal axis the ends of which lie at a pair of cardinal points of the compass to normally position the juncture line between said dome and bowl to lie in a horizontal plane perpendicular to said vertical axis and to the vertical axis of said bowl, and means mounted in said bowl for compensating the compass for magnetic deviation, said compensating means comprising apertures positioned at the intercardinal points of said compass bowl, one pair of said apertures lying in a horizontal plane and a second pair of said apertures lying in a horizontal plane above said first plane, a pair of shafts each extending from one of said apertures in a plane to the other of the apertures in that plane, each shaft extending from an intercardinal point to the diametrically opposite intercardinal point, a reduced diameter portion on each said shaft at its midpoint, said horizontal planes being spaced apart vertically a distance less than the sum of the radii of said two reduced diameter portions whereby said compensating shafts are held in position in said apertures and are frictionally engaged to cause them to retain an adjusted rotational position, and a pair of compensating magnets mounted on each said compensating shaft, the magnets of each pair being mounted equidistant from the reduced diameter portion of the respective shaft, said magnets being mounted eccentrically with respect to said shaft, one magnet of the pair having its greater portion extending beyond the shaft in one direction and the other magnet of the pair having its greater portion extending beyond the shaft in the opposite direction, said magnets being mounted so that like poles of the magnets lie at equal distances from the respective shaft.

12. In a compass as claimed in claim 11 said reduced diameter portions of said shafts interengaging at a point substantially in alignment with the axis of said sphere perpendicular to said horizontal planes.

13. In a compass as claimed in claim 11 said shafts being provided with apertures extending therethrough transversely to the shaft axis and said compensating magnets being cylindrical and being mounted in said apertures.

14. Means for compensating for magnetic deviation of a compass comprising, in combination, a pair of closely adjacent shafts extending horizontally crossing each other at right angles at a point substantially in alignment with the vertical axis of the compass, a pair of compensating magnets mounted on each said shaft, the magnets of each pair being mounted eccentrically of the respective shaft, one magnet of the pair extending a greater distance from the shaft in one direction and the other magnet of the pair extending a greater distance from the shaft in the opposite direction, two like magnetic poles lying at the greater and two at the lesser distance from the shaft, said magnets of said two pairs forming substantially a ring when said shafts are rotated to bring said magnets into a pair of closely adjacent parallel planes, said magnets of each said pair being spaced at equal distances on opposite sides of said vertical axis.

15. In a compensating means as claimed in claim 14 one of said pair of shafts being spaced from the compass magnet a greater distance than the other and the compensating magnets on said one shaft being of a greater length than those mounted on said other shaft such that when said shafts are rotated through 90° from the position in which said magnets lie in said parallel planes, the poles of the magnets of said two shafts which are closest to the compass magnets are equally spaced therefrom.

References Cited by the Examiner
UNITED STATES PATENTS

| | | | |
|---|---|---|---|
| 1,737,487 | 11/1929 | Wunsch | 33—222 |
| 1,977,954 | 10/1934 | Reichel | 33—225 |
| 1,987,383 | 1/1935 | White | 33—223 |
| 2,020,905 | 11/1935 | Robert | 33—225 X |
| 2,026,919 | 1/1936 | Stright | 33—223 |
| 2,446,568 | 8/1948 | Wolfe | 33—223 X |
| 2,873,536 | 2/1959 | Rieger | 33—225 |
| 2,941,307 | 6/1960 | Frisbie | 33—223 |
| 2,943,398 | 7/1960 | Hull | 33—225 |

FOREIGN PATENTS

| | | |
|---|---|---|
| 472,232 | 2/1929 | Germany. |
| 13,265 | 1895— | Great Britain. |
| 323,358 | 19/1957 | Switzerland. |

OTHER REFERENCES

S. G. Starling: Electricity and Magnetism, Longmans, Green & Co., N.Y., 5th ed. 1929, pp. 3–4 and 15–18.

ROBERT B. HULL, *Primary Examiner.*